(12) United States Patent
Master et al.

(10) Patent No.: US 7,620,678 B1
(45) Date of Patent: *Nov. 17, 2009

(54) METHOD AND SYSTEM FOR REDUCING THE TIME-TO-MARKET CONCERNS FOR EMBEDDED SYSTEM DESIGN

(75) Inventors: Paul L. Master, Sunnyvale, CA (US); W. James Scheuermann, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 875 days.

This patent is subject to a terminal disclaimer.

(21) Appl. No.: 10/459,859

(22) Filed: Jun. 12, 2003

Related U.S. Application Data

(60) Provisional application No. 60/388,249, filed on Jun. 12, 2002.

(51) Int. Cl.
*G06F 15/76* (2006.01)

(52) U.S. Cl. .......................... 709/200; 712/15; 712/17; 712/29

(58) Field of Classification Search ............ 712/10–22, 712/29; 709/221, 223–226, 208–211; 716/16
See application file for complete search history.

(56) References Cited

U.S. PATENT DOCUMENTS

| | | | |
|---|---|---|---|
| 4,344,134 A * | 8/1982 | Barnes ......................... | 712/16 |
| 5,144,166 A | 9/1992 | Camarota et al. | |
| 5,163,120 A * | 11/1992 | Childers et al. ............... | 712/15 |
| 5,218,240 A | 6/1993 | Camarota et al. | |
| 5,245,227 A | 9/1993 | Furtek et al. | |
| 5,333,270 A * | 7/1994 | Brief et al. .................. | 709/221 |
| 5,336,950 A | 8/1994 | Popli et al. | |
| 5,371,852 A * | 12/1994 | Attanasio et al. ............ | 709/245 |
| 5,450,557 A | 9/1995 | Kopp et al. | |
| 5,483,276 A | 1/1996 | Brooks et al. | |
| 5,646,544 A | 7/1997 | Iadanza | |
| 5,737,631 A | 4/1998 | Trimberger | |
| 5,787,237 A * | 7/1998 | Reilly ........................ | 358/1.13 |
| 5,818,603 A | 10/1998 | Motoyama | |
| 5,828,858 A | 10/1998 | Athanas et al. | |
| 5,841,973 A * | 11/1998 | Kessler et al. ............... | 709/250 |
| 5,889,816 A | 3/1999 | Agrawal et al. | |
| 5,892,961 A | 4/1999 | Trimberger | |
| 5,907,580 A | 5/1999 | Cummings | |
| 5,910,733 A | 6/1999 | Bertolet et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,970,254 A | 10/1999 | Cooke et al. | |
| 5,991,302 A | 11/1999 | Berl et al. | |
| 6,021,490 A | 2/2000 | Vorbach et al. | |
| 6,023,742 A | 2/2000 | Ebeling et al. | |
| 6,046,603 A * | 4/2000 | New ........................... | 326/38 |
| 6,073,132 A | 6/2000 | Gehman | |

(Continued)

*Primary Examiner*—Ario Etienne
*Assistant Examiner*—Brendan Y Higa
(74) *Attorney, Agent, or Firm*—Patterson & Sheridan, LLP

(57) ABSTRACT

Aspects for reducing the time-to-market concerns for embedded system design are described. The aspects include providing an infrastructure to support a plurality of heterogeneous processing nodes as a reconfigurable network. Further included is utilizing the infrastructure to customize at least one of the heterogeneous processing nodes according to individualized design needs to achieve a desired embedded system signal processing engine.

20 Claims, 11 Drawing Sheets

U.S. PATENT DOCUMENTS

| | | | |
|---|---|---|---|
| 6,076,152 A * | 6/2000 | Huppenthal et al. | 712/15 |
| 6,081,903 A | 6/2000 | Vorbach et al. | |
| 6,088,043 A | 7/2000 | Kelleher et al. | |
| 6,094,065 A | 7/2000 | Tavana et al. | |
| 6,112,288 A * | 8/2000 | Ullner | 712/20 |
| 6,115,751 A * | 9/2000 | Tam et al. | 709/240 |
| 6,119,181 A | 9/2000 | Vorbach et al. | |
| 6,120,551 A | 9/2000 | Law et al. | |
| 6,122,719 A * | 9/2000 | Mirsky et al. | 712/15 |
| 6,128,720 A * | 10/2000 | Pechanek et al. | 712/20 |
| 6,150,838 A | 11/2000 | Wittig et al. | |
| 6,151,688 A * | 11/2000 | Wipfel et al. | 714/48 |
| 6,230,307 B1 | 5/2001 | Davis et al. | |
| 6,237,029 B1 | 5/2001 | Master et al. | |
| 6,266,760 B1 | 7/2001 | DeHon et al. | |
| 6,282,627 B1 | 8/2001 | Wong et al. | |
| 6,289,440 B1 * | 9/2001 | Casselman | 712/227 |
| 6,334,177 B1 * | 12/2001 | Baumgartner et al. | 712/13 |
| 6,338,106 B1 | 1/2002 | Vorbach et al. | |
| 6,353,841 B1 | 3/2002 | Marshall et al. | |
| 6,405,299 B1 | 6/2002 | Vorbach et al. | |
| 6,408,039 B1 | 6/2002 | Ito | |
| 6,425,068 B1 | 7/2002 | Vorbach et al. | |
| 6,433,578 B1 | 8/2002 | Wasson | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,653,859 B2 * | 11/2003 | Sihlbom et al. | 326/38 |
| 6,697,979 B1 | 2/2004 | Vorbach et al. | |
| 6,721,286 B1 | 4/2004 | Williams et al. | |
| 6,721,581 B1 * | 4/2004 | Subramanian | 455/575.1 |
| 6,836,839 B2 * | 12/2004 | Master et al. | 712/29 |
| 6,920,545 B2 * | 7/2005 | Farwell et al. | 712/15 |
| 7,002,956 B2 * | 2/2006 | Banerjee et al. | 370/389 |
| 7,003,660 B2 | 2/2006 | Vorbach et al. | |
| 7,127,590 B1 * | 10/2006 | Lindquist | 712/29 |
| 7,185,046 B2 * | 2/2007 | Ferstl et al. | 709/201 |
| 7,210,129 B2 | 4/2007 | May et al. | |
| 7,266,725 B2 | 9/2007 | Vorbach et al. | |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2002/0194397 A1 * | 12/2002 | Creamer et al. | 709/328 |
| 2003/0033600 A1 | 2/2003 | Cliff et al. | |
| 2005/0022173 A1 * | 1/2005 | Kanade | 717/140 |

* cited by examiner

NODE WRAPPER / MEMORY INTERFACES

Memory Write

| SIGNAL | SIGNAL DIRECTION | DESCRIPTION |
|---|---|---|
| Data[31:0] | to memory | IN_PIPE_REG[31:0]<br>Data that is to be stored into memory. |
| Address[15:2] | to memory | HTH_MEM_WRT_ADDR[15:2]<br>The memory location addressed by these signals is written. When memory is organized as 1K-by-32 blocks, the upper four bits, Address[15:12] select the memory block, and the lower ten bits, Address[11:2] select the location within the block.<br>When the node consists of one tile, Address[13:12] are decoded to select one of four memory blocks. When the node consists of two tiles, Address[14:12] are decoded to select one of eight memory blocks. And when the node consists of four tiles, Address[15:12] are decoded to select one of sixteen memory blocks. |
| Poke | to memory | HTH_POKE_PORT<br>When this signal is a '1', the memory write address is the Poke Address.<br>When this signal is a '0', the memory write address is the PTT address. |
| Mode | to memory | PTT_MEM_OUT[20]<br>For PTT memory write cycles, this bit is set to '0' to indicate sequential addressing. This bit is set to '1' to indicate some node-specific non-sequential addressing mode, such as FFT bit reversing for the RAN and AN2 nodes, cache lines for ARCs, and so on.<br>When the Poke signal is a '1', this signal is don't care. |
| Size[3:0] | to memory | PTT_MEM_OUT[19:16]<br>These bits indicate the size of the memory buffer that is being written. This supports non-sequential addressing modes, such as bit reversing for FFT. When the Poke signal is a '1' or when the Mode signal is a '0', these signals can be ignored. |

| CODE | BUFFER SIZE (bytes) |
|---|---|
| 0000 | 4 |
| 0001 | 8 |
| 0010 | 16 |
| 0011 | 32 |
| 0100 | 64 |
| 0101 | 128 |
| 0110 | 256 |
| 0111 | 512 |
| 1000 | 1024 |
| 1001 | 2048 |
| 1010 | 4096 |
| 1011 | 8192 |
| 1100 | 16384 |
| 1101 | 32768 |
| 1110 | 65536 |

| SIGNAL | SIGNAL DIRECTION | DESCRIPTION |
|---|---|---|
| Write! | to memory | HTH_MEM_WRT_CMD<br>When this signal is asserted, the memory must execute a write cycle immediately. The command cannot be stalled. There is no bound on the number of consecutive write commands. |

FIG. 5A

NODE WRAPPER / MEMORY INTERFACES

Memory Read

| SIGNAL | SIGNAL DIRECTION | DESCRIPTION |
|---|---|---|
| Address[15:2] | to memory | HTM_MEM_RD_ADDR[15:2] |
| | | The memory location addressed by these signals is read. When memory is organized as 1K-by-32 blocks, the upper four bits, Address[15:12] select the memory block, and the lower ten bits, Address[11:2] select the location within the block. |
| | | When the node consists of one tile, Address[13:12] are decoded to select one of four memory blocks. When the node consists of two tiles, Address[14:12] are decoded to select one of eight memory blocks. And when the node consists of four tiles, Address[15:12] are decoded to select one of sixteen memory blocks. |
| Read! | to memory | HTM_MEM_RD_REQ |
| | | When the signal is asserted, the memory must execute a read cycle immediately. The command cannot be stalled. There is a handshake signal from memory to allow for its memory address register and, if present, its data output register. |
| Data Available | from memory | MEM_HTM_RD_GNT |
| | | In response to the assertion of Read! the memory controller asserts its Data Available signal for the clock period when the Memory Read Data is valid. Data Available normally will be asserted after one (MAR only) or two (MAR plus MDOR) clock periods. |
| Data[31:0] | from memory | MEM_READ_DATA[31:0] |
| | | Data read from memory. Valid for the clock period when the Data Available signal is asserted. |

FIG. 5B

Enable Execution Unit

| SIGNAL | SIGNAL DIRECTION | DESCRIPTION |
|---|---|---|
| Enable | to eu | NODE_ENABLED<br>This signal corresponds to the NCR Enable Bit. When it is a '0', the node ceases all operation, except that it continues to support PEEK and POKE operations. The NCR Enable Bit must be set to '1' to enable any other node functions. This functions as a local reset signal to the execution unit. |

FIG. 6A

Poke Execution Unit

| SIGNAL | SIGNAL DIRECTION | DESCRIPTION |
|---|---|---|
| Data[15:0] | to eu | IN_PIPE_REG[31:16]<br>The execution unit stores this data into the register specified by Address[12:2] when the Poke signal is asserted. |
| Address[12:2] | to eu | IN_PIPE_REG[12:2]<br>The execution unit stores Data[15:0] into the register specified by this address when the Poke signal is asserted. |
| Poke | to eu | POKE_EUSR<br>When this signal is a '1', the execution unit must write Data[15:0] into its register specified by Address[12:2]. This operation cannot be stalled. |

FIG. 6B

Peek Execution Unit

| SIGNAL | SIGNAL DIRECTION | DESCRIPTION |
|---|---|---|
| Address[12:2] | to eu | IN_PIPE_REG[12:2] |
| | | The execution unit returns Data[15:0] from its register specified by this address when the Peek signal is asserted. |
| Data[15:0] | from eu | EUSR_PEEK_DATA[15:0] |
| | | The execution unit returns this data from its register specified by Address[12:2] when the Peek signal is asserted. |
| Peek | to eu | PEEK_EUSR |
| | | When this signal is a '1', the execution unit must return Data[15:0] from its register specified by Address[12:2]. This operation cannot be stalled. |

FIG. 6C

Execution Unit Pointer

| SIGNAL | SIGNAL DIRECTION | DESCRIPTION |
|---|---|---|
| Pointer[15:1] | to eu | MPT_BR[9:0]+ACTIVE_TASK[4:0] |
| | | The K-node stores the node's 32-by-16 MPL (Module Parameter List) Pointers Table in 16 consecutive longwords, starting on a longword boundary and identified by {Pointer[15:6]=MPT_BR[9:0] }, in the node's memory. |
| | | The pointer is a word (16-bit) address at which the K-node has stored a 14-bit longword address that indicates the location in memory where the first entry in the active task's Module Parameter List (MPL) is stored. |

FIG. 6D

Execution Unit Network Interface

The execution unit transfers data to its output buffers and it transfers ack messages to PCT_CCT tables via the ACM network. A request / grant pair to / from the node wrapper's data aggregator controls these transfers. Each transfer includes routing, service and auxiliary information in addition to 32 bit data.

The execution unit asserts its request signal when it wishes to transfer data (or messages). If its grant signal is asserted during the same clock period, its data has been accepted, and there is no stall. If its grant signal is not asserted during a clock period when its request signal is asserted, then the execution unit must stall for that clock period and subsequent clock periods when its grant signal is not asserted.

| SIGNAL | SIGNAL DIRECTION | DESCRIPTION |
|---|---|---|
| Request | from eu | EU_REQ_AGG |
| | | When this signal is asserted, the execution unit is requesting a transfer of its output data to the node's aggregator. |
| Grant | to eu | AGG_GNT_EU |
| | | When this signal is asserted, the aggregator has accepted the execution unit's output data. When the execution unit's request signal is asserted and the aggregator's grant signal is not asserted, the execution unit must stall. |
| Route[7:0] | from eu | EU_ROUTE[7:0] |
| | | These signals supply the routing information that identifies the intended recipient. |
| Service[1:0] | from eu | EU_SERVICE[1:0] |
| | | These signals identify the type of network service for this transfer. |

| CODE | SERVICE |
|---|---|
| 0 0 | Point-to-point (word) using the HTM PTT; |
| 0 1 | Ack Message; |
| 1 0 | Point-to-point (packet) using the HTM PTT; |
| 1 1 | Point-to-point (packet+release) using the HTM PTT; |

| | | |
|---|---|---|
| Auxiliary[5:0] | from eu | EU_AUX[5:0] |
| | | These signals represent the auxiliary information such as port number, ack message type, and so on. |
| Data[31:0] | from eu | EU_DATA[31:0] |

FIG. 6E

Execution Unit State Interface

While the NODE_ENABLED signal is not asserted, the execution unit will be in its IDLE state. While the NODE_ENABLED signal is asserted and the EU_RUN signal is not asserted, the execution unit will be in its IDLE state.

When the NODE_ENABLED signal is asserted and the EU_RUN signal transitions from "not asserted" to "asserted", the execution unit will enter its RUN state. The first interval during its RUN state will be SETUP when it initializes itself from its MPL. The second interval during its RUN state will be EXECUTION, and the third interval will be ACK_MESSAGE_GENERATION. The final ack message will include a TEST indication, and after this message has been granted by the aggregator, the execution unit will enter its WAIT state.

After the node wrapper has received and processed the execution unit's ack+test message, it will assert for one clock period one of two signals: EU_CONTINUE will be asserted when the task can execute again. This will occur when the task's GO bit remains asserted, its buffers are still available, and the ready-to-run FIFO is empty. Otherwise, EU_TEARDOWN will be asserted, the execution unit will complete its task teardown and assert its EU_DONE indication, resulting in the node wrapper's de-asserting EU_RUN.

| SIGNAL | SIGNAL DIRECTION | DESCRIPTION |
|---|---|---|
| Run | to eu | EU_RUN |
| | | When this signal is asserted, the execution unit cycles through its SETUP, EXECUTION, ACK_MESSAGE_GENERATION, TEST AND WAIT states. |
| | | If WAIT and EU_CONTINUE, it once again cycles though these states. |
| | | Else if WAIT and EU_TEARDOWN, the execution unit completes its task teardown and asserts its EU_DONE indication, causing the node wrapper to de-assert EU_RUN. |
| Continue | to eu | EU_CONTINUE |
| | | When this signal is asserted, the execution unit is instructed to cycle again through its RUN states. |
| Teardown | to eu | EU_TEARDOWN |
| | | When this signal is asserted, the execution unit is instructed to complete its teardown and assert its EU_DONE signal. |
| Done | from eu | EU_DONE |
| | | When this signal is asserted, the execution unit indicates to the node wrapper that it has completed its teardown in anticipation of yielding to the next task (if any) in the ready-to-run queue. |

FIG. 6F

Execution Unit Messages

The execution unit can trigger a message from the node wrapper to the K-node by asserting its message request signal. The node wrapper acknowledges sending the message by asserting its message grant signal. The execution unit shall write information into its MPL identifying the condition that triggered the message. (For example, watchdog timer expiration, tbd exception condition, and so on).

| SIGNAL | SIGNAL DIRECTION | DESCRIPTION |
|---|---|---|
| Request | from eu | EU_MSG_REQ |
| | | The execution unit asserts this signal to instruct the node wrapper to send a message to the K-node. Once asserted, this signal must remain asserted until the grant is received from the node wrapper. |
| Grant | to eu | GNT_EU_MSG |
| | | The node wrapper asserts this signal for one clock period to acknowledge its sending the message to the K-node. When the execution unit receives this asserted signal, it must de-assert its request at the next active clock edge. |

FIG. 6G

METHOD AND SYSTEM FOR REDUCING THE TIME-TO-MARKET CONCERNS FOR EMBEDDED SYSTEM DESIGN

CROSS-REFERENCE TO RELATED APPLICATION

This application is claiming under 35 USC 119(e) the benefit of provisional patent application Ser. No. 60/388,249 filed on Jun. 12, 2002.

FIELD OF THE INVENTION

The present invention relates to reducing the time-to-market concerns for embedded system design.

BACKGROUND OF THE INVENTION

The electronics industry has become increasingly driven to meet the demands of high-volume consumer applications, which comprise a majority of the embedded systems market. Embedded systems face challenges in producing performance with minimal delay, minimal power consumption, and at minimal cost. As the numbers and types of consumer applications where embedded systems are employed increases, these challenges become even more pressing. Examples of consumer applications where embedded systems are employed include handheld devices, such as cell phones, personal digital assistants (PDAs), global positioning system (GPS) receivers, digital cameras, etc. By their nature, these devices are required to be small, low-power, light-weight, and feature-rich.

In the challenge of providing feature-rich performance, the ability to update the product's capabilities with advancements in a given industry to meet customer needs remains desirable. However, significant time in incurred as each design goes through the development process and reaches the market. Any reduction in the time-to-market for embedded processing products to meet the needs of the customer is considered beneficial. Accordingly, what is needed is a manner of reducing the time-to-market concerns for embedded processing solutions that attack particular application spaces. The present invention addresses such a need.

SUMMARY OF THE INVENTION

Aspects for reducing the time-to-market concerns for embedded system design are described. The aspects include providing an infrastructure to support a plurality of heterogeneous processing nodes as a reconfigurable network. Further included is utilizing the infrastructure to customize at least one of the heterogeneous processing nodes according to individualized design needs to achieve a desired embedded system signal processing engine.

With the aspects of the present invention, supplementation of an existing infrastructure for an embedded system with individualized/proprietary functionality reduces the time needed to develop a signal processing product to meet a particular market need. Such time savings is of considerable value in the rapidly changing environment of the embedded system market. These and other advantages will become readily apparent from the following detailed description and accompanying drawings.

BRIEF DESCRIPTION OF THE DRAWINGS

FIGS. 5a and 5b present tables of the signals, signal directions, and signal description for the node wrapper unit and memory unit interface signals shown in FIG. 4.

FIGS. 6a, 6b, 6c, 6d, 6e, 6f, and 6g present tables for the signals, signal directions, and signal descriptions for node wrapper unit and execution unit interface signals shown in FIG. 4.

DETAILED DESCRIPTION OF THE INVENTION

The present invention relates to reducing the time-to-market concerns for embedded system design. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In order to reduce the time-to-market of an embedded system design/signal processing product, the present invention utilizes a homogeneous, scalable, extreme bandwidth network that connects heterogeneous nodes (computational elements), intelligent memory controllers, and configurable input/output ports and system bus interfaces, as described in co-pending U.S. patent application Ser. No. 10/241,511, entitled Method and System for an Interconnection Network to Support Communications among a Plurality of Heterogeneous Processing Elements, filed Sep. 10, 2002, assigned to the assignee of the present invention and incorporated by reference in its entirety herein. Portions of that description are reproduced hereinbelow for clarity of presentation of the aspects of the present invention.

Figure 1:
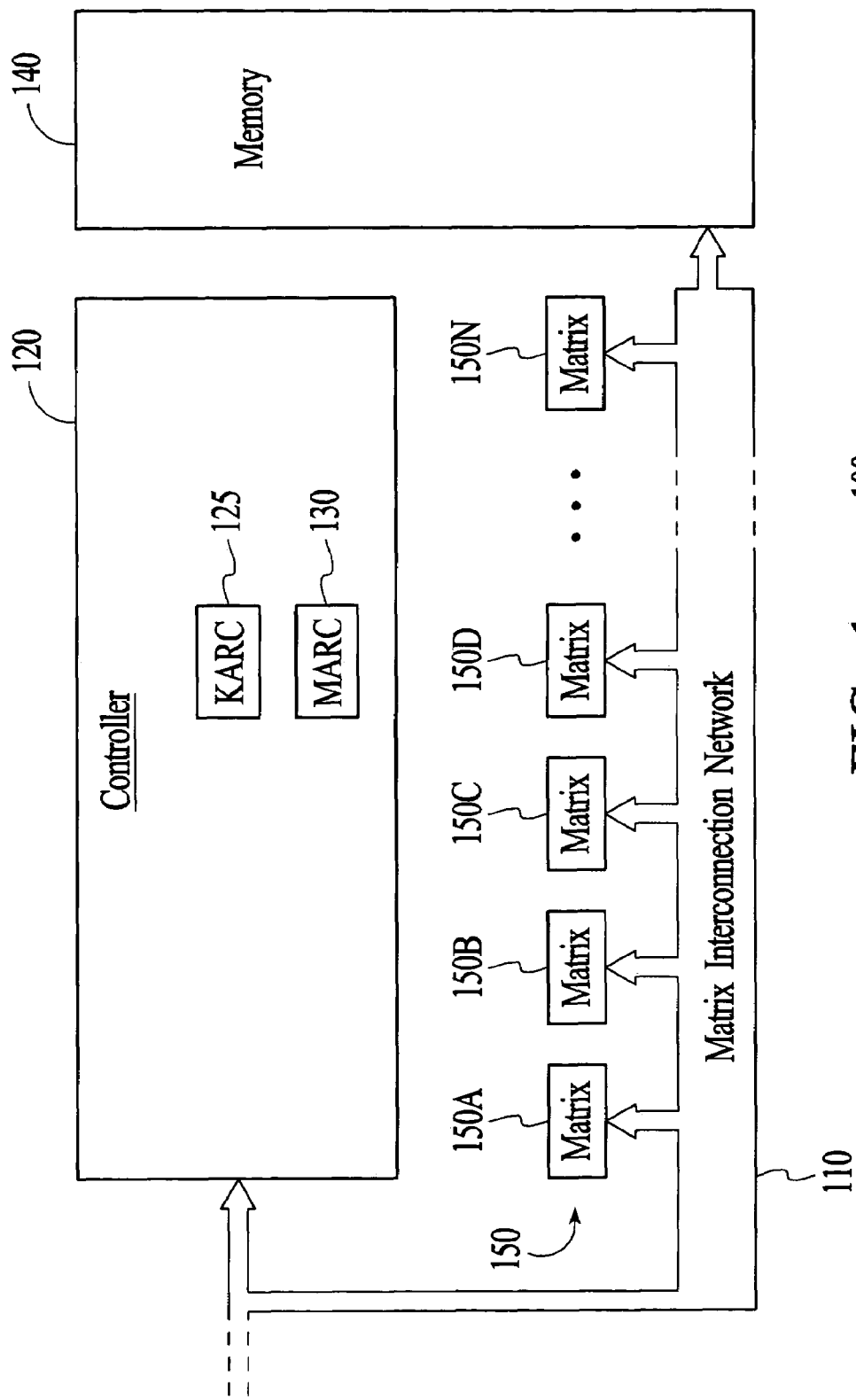
FIG. 1 is a block diagram illustrating an adaptive computing engine.

Referring to FIG. 1, a block diagram illustrates an adaptive computing engine ("ACE") 100, which is preferably embodied as an integrated circuit, or as a portion of an integrated circuit having other, additional components. In the preferred embodiment, and as discussed in greater detail below, the ACE 100 includes a controller 120, one or more reconfigurable matrices 150, such as matrices 150A through 150N as illustrated, a matrix interconnection network 10, and preferably also includes a memory 140.

The controller 120 is preferably implemented as a reduced instruction set ("RISC") processor, controller or other device or IC capable of performing the two types of functionality. The first control functionality, referred to as "kernal" control, is illustrated as kernal controller ("KARC") 125, and the second control functionality, referred to as "matrix" control, is illustrated as matrix controller ("MARC") 130.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units, which in turn generally contain a different or varied mix of fixed, application specific computational elements, which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network (MIN) 110.

In accordance with the present invention, the MIN 110 provides a foundation that allows a plurality of heterogeneous processing nodes, e.g., matrices 150, to communicate by providing a single set of wires as a homogeneous network to support plural services, these services including DMA (direct memory access) services, e.g., Host DMA (between the host processor and a node), and Node DMA (between two nodes), and read/write services, e.g., Host Peek/Poke (between the host processor and a node), and Node Peek/Poke (between two nodes). In a preferred embodiment, the plurality of heterogeneous nodes is organized in a manner that allows scalability and locality of reference while being fully connected via the MIN 110. U.S. patent application Ser. No. 09/898,350 entitled Method and System for an Interconnection Network to Support Communications Among a Plurality of Heterogeneous Processing Elements filed on Jul. 3, 2001, discusses an interconnection network to support a plurality of processing elements and is incorporated by reference herein.

Figure 2:
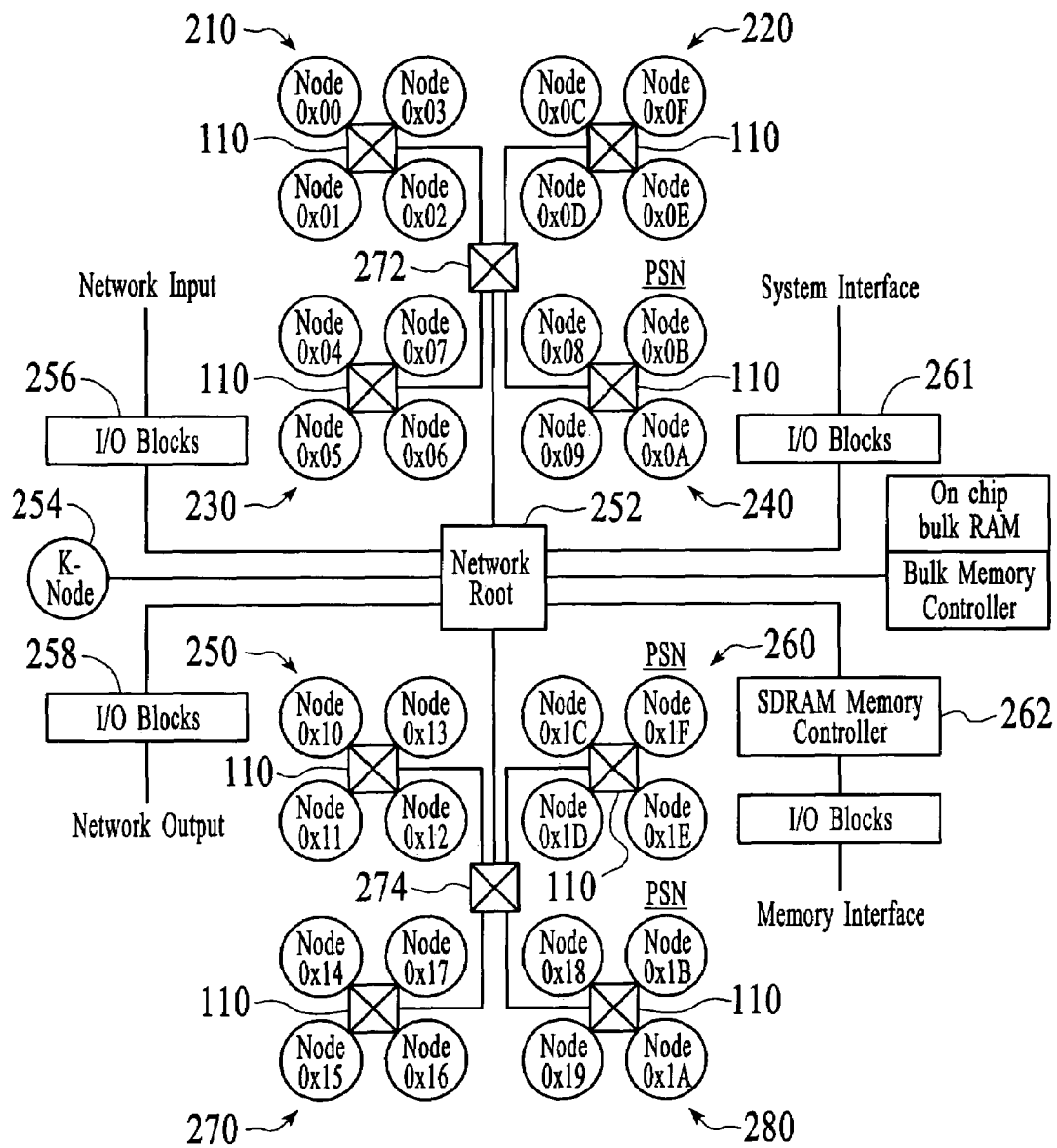
FIG. 2 illustrates a network architecture in accordance with the present invention.

FIG. 2 illustrates a network architecture 200 in accordance with the present invention. In this embodiment there are four groupings 210-280 of nodes. As is seen, grouping 210-240 can communicate with MIN 272 and groupings 250-280 communicate with MIN 274. MINs 272 and 274 communicate with the network root 252. A MIN 110 further supports communication between nodes in each grouping and a processing entity external to the grouping 210, via a network root 252. The network root 250 is coupled to a K-Node 254, network input and output I/O blocks 256 and 258, system interface I/O blocks 261, a SRAM memory controller 262, and an on/chip bulk RAM/bulk memory 264. In a preferred embodiment, the organization of nodes as a grouping 210-280 can be altered to include a different number of nodes and can be duplicated as desired to interconnect multiple sets of groupings, e.g., groupings 230, 240, and 250, where each set of nodes communicates within their grouping and among the sets of groupings via the MIN 110.

Figure 3:
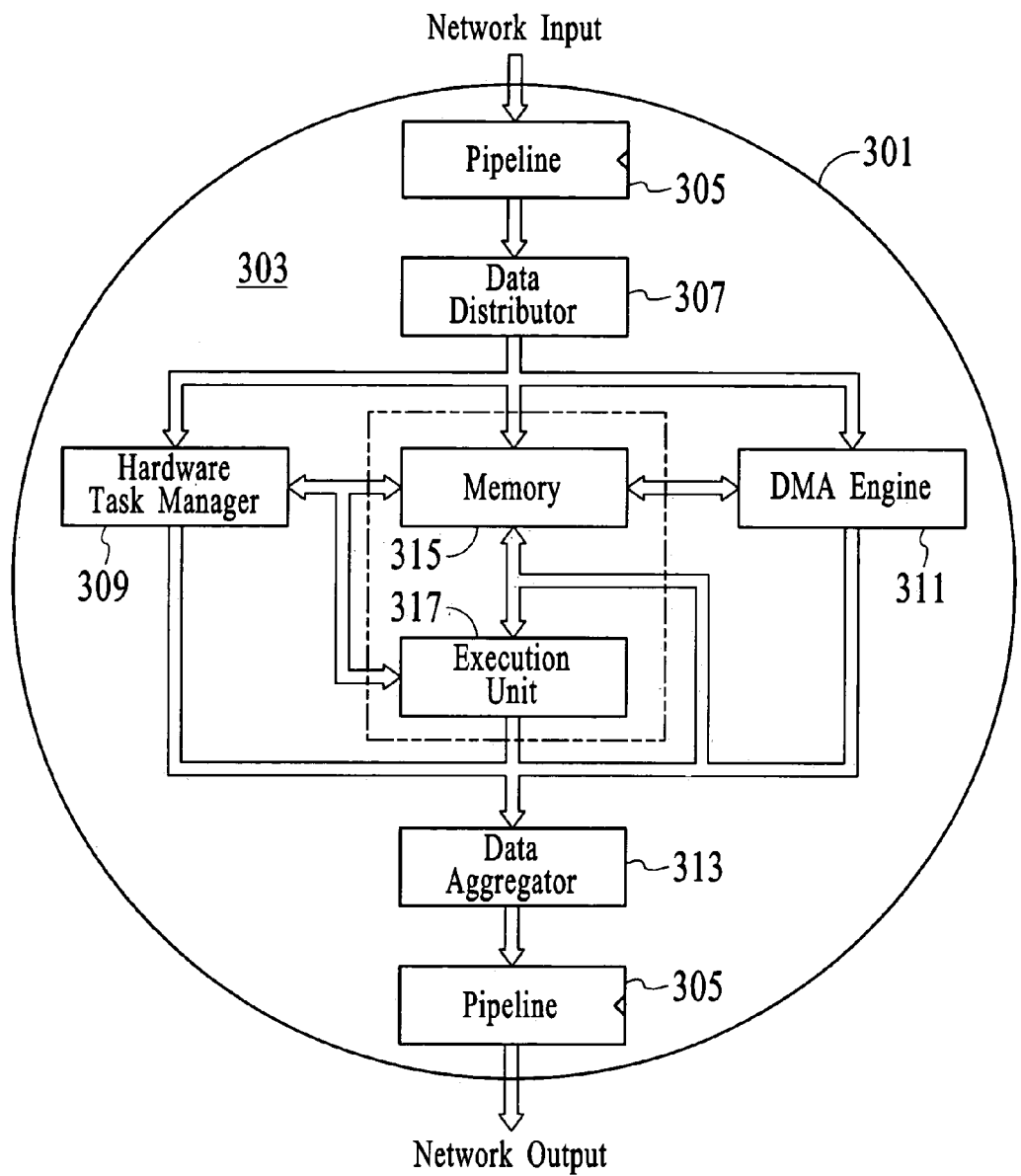
FIG. 3 illustrates a block diagram of the elements of the nodal architecture in a preferred embodiment for a single node.

This ability to interconnect different nodes in a flexible and seamless manner provides structured support within which flexibility exists for customization of function, i.e., the structure and flexibility of the infrastructure of the MIN 110 is conducive for achieving structure and flexibility within each node of the MIN 110. Referring now to FIG. 3, the elements of the nodal architecture in a preferred embodiment are illustrated for a single node 301. The node wrapper 303 provides all support services for the nodes, including network interfacing, PEEK/POKE support, DMA, etc., through its pipelines 305 coupled to a network input and a network output and its data distributor 307, hardware task manager 309, DMA engine 311, and data aggregator 313. Through an API, the node wrapper 303 interfaces seamlessly to execution unit 315/memory unit 317 combinations within the node 301.

Figure 4:
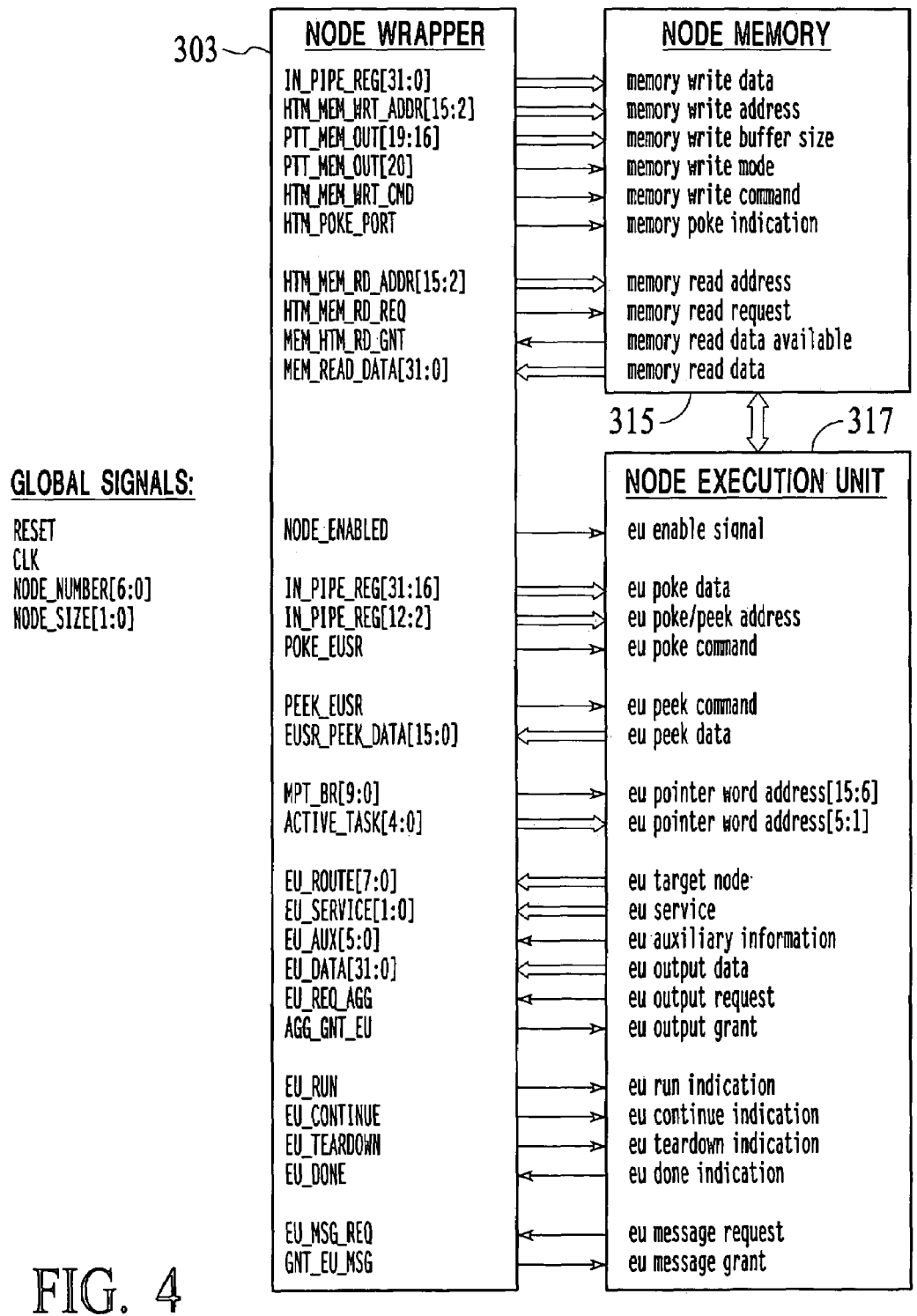
FIG. 4 illustrates signals for the interfaces within a node between the node wrapper unit, the node memory unit, and the node execution unit in accordance with a preferred embodiment of the present invention.

FIG. 4 illustrates signals for the interfaces within a node between the node wrapper unit 303, the node memory unit 317, and the node execution unit 315 in accordance with a preferred embodiment of the present invention. While FIGS. 5a and 5b present tables of the signals, signal directions, and signal description for the node wrapper unit and memory unit interface signals shown in FIG. 4, and FIGS. 6a, 6b, 6c, 6d, 6e, 6f, and 6g present tables for the signals, signal directions, and signal descriptions for node wrapper unit and execution unit interface signals shown in FIG. 4, it should be appreciated that the names and number of bits for each signal are illustrative and not restrictive. Further, the descriptions of the signals illustrate the transactions anticipated as necessary for achieving robust processing by the node, as is well appreciated by those skilled in the art.

With these interfaces common within each node and across the node network, the integration of a particular execution unit 315 readily occurs by exploiting the set of interfaces. Thus, individual and proprietary designs need only address the functions required by the execution unit within one or more nodes to achieve a desired processing function while meeting the signal requirements for the infrastructure of the network and node interfaces presented herein. By relying on the infrastructure of the node network that supports heterogenuity and adaptability, quick and efficient development of embedded system architecture can be realized in less time than would traditionally be required and with reduced program risk. Further reduction in the time-to-market concerns are realized when the individual and proprietary designs are combined with other, preexisting node type designs, such as RISC processors, DSP processors, reconfigurable arithmetic processors, reconfigurable bit-manipulative intensive processors, reconfigurable Viterbi decoders and finite arithmetic units, reconfigurable, high sample rate correlators and convolvers, etc.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A system for providing individualized design for embedded systems using an adaptive computing engine, the system comprising:

a plurality of heterogeneous processing nodes, each one of the heterogeneous processing nodes including an interface that supports a definition of the processing performed by the adaptive computing engine through customization of elements in each of the heterogeneous processing nodes, wherein each of the heterogeneous processing nodes comprises a plurality of reconfigurable matrices, and each of the matrices includes a different mix of fixed and configurable application specific integrated circuits;

a controller for separately configuring each one of the heterogeneous processing nodes according to individualized design needs of the adaptive computing engine thereby providing a desired embedded function;

a matrix interconnection network for communication between each of the heterogeneous processing nodes and a controller and carrying data capable of configuring and reconfiguring the plurality of heterogeneous processing nodes to execute different functions in the heterogeneous processing nodes, the matrix interconnection network supporting plural services including direct memory access services and read/write services between the heterogeneous processing nodes and a host processor; and a network root configured to communicate with a first network and a second network, wherein a first set of the plurality of heterogeneous processing nodes is configured as a first group that is configured to execute a plurality of functional nodes and that communicates using the first network, and wherein a second set of the plurality of heterogeneous processing nodes is configured as a second group that is configured to execute a plurality of functional nodes different than the functional nodes executed by the first group and that communicates using the second network, the network root providing communication between each of the nodes of the first and second groups and a single common system interface, a bulk RAM, a common memory interface, and a network output interface.

2. The system of claim 1 wherein the interface further comprises a node wrapper unit interfacing with a node memory unit and a node execution unit.

3. The system of claim 2 wherein the interface supports supplementation through replacement of the node execution unit with a customized node execution unit in one or more of the plurality of heterogeneous processing nodes.

4. The system of claim 3 wherein the node wrapper unit further interfaces with the matrix interconnection network.

5. The system of claim 2, wherein the node execution unit is configured to be in an idle state when a node enabled signal is not asserted by the node wrapper or when the node enabled signal is asserted by the node wrapper and an execution unit run signal is not asserted by the node wrapper.

6. The system of claim 5, wherein the node execution unit is configured to perform initialization, execution, and generate an acknowledge message that is output to the node wrapper when the node execution unit transitions from the idle state to a run state.

7. The system of claim 6, wherein the acknowledge message includes a test indication.

8. The system of claim 6, wherein, after processing the acknowledge message, the node wrapper is configured to assert, for one clock period, an execution unit continue signal to the node execution unit to cause the node execution unit to resume execution of a task.

9. The system of claim 8, wherein the node wrapper is configured to asserted the execution unit continue signal when a go bit associated with the task is asserted, buffers associated with the task are available, and a ready-to-run FIFO is empty.

10. The system of claim 6, wherein, after processing the acknowledge message, the node wrapper is configured to assert, for one clock period, an execution unit teardown signal to the node execution unit to cause the node execution unit to complete teardown of a task.

11. The system of claim 10, wherein the node execution unit is configured to assert an execution unit done signal to the node wrapper when teardown of the task is completed.

12. The system of claim 11, wherein the node wrapper is configured to de-assert the execution unit run signal when the node wrapper the execution unit done signal is asserted.

13. The system of claim 2, wherein the execution unit is configured to trigger a message from the node wrapper to a K-node that is coupled to the network root by asserting a message request signal to the node wrapper and write information identifying a trigger condition in a module parameter list in the K-node.

14. The system of claim 1, wherein the first network is a first homogeneous network, the second network is a second homogeneous network, and the network root is configured for communication between the first homogeneous network to the second homogeneous network.

15. The system of claim 1, wherein the plurality of heterogeneous processing nodes comprises:
a first one of the plurality of heterogeneous processing nodes configured to perform a first function according to the individualized design needs;
a second one of the plurality of heterogeneous processing nodes configured to perform a second function according to the individualized design needs that is different than the first function; and
additional heterogeneous processing nodes within the plurality of heterogeneous processing nodes that are each configured to perform a different function than any of the other heterogeneous processing nodes.

16. The system of claim 1, wherein the controller includes a kernel controller that is configured to provide a first control functionality and a matrix controller that is configured to provide a second control functionality.

17. A system for providing individualized design for embedded systems using an adaptive computing engine, the system comprising:
an infrastructure means to support a plurality of heterogeneous processing nodes as the adaptive engine, the infrastructure including:
the heterogeneous processing nodes, each of the heterogeneous processing nodes comprising a plurality of reconfigurable matrices, and each of the matrices including a different mix of fixed and configurable application specific integrated circuits;
a controller for separately configuring each one of the heterogeneous processing nodes according to individualized design needs of the adaptive computing engine thereby providing a desired embedded function; and
a single set of wires defining a matrix interconnection network for communication between each of the heterogeneous processing nodes and a controller and carrying data capable of configuring and reconfiguring the plurality of heterogeneous processing nodes to execute different functions in the heterogeneous processing nodes, the matrix interconnection network supporting plural services including direct memory access services and read/write services between the heterogeneous processing nodes and a host processor;
means for utilizing the infrastructure to customize a first one of the heterogeneous processing nodes according to the individualized design needs to provide the desired embedded system;
means for utilizing the infrastructure to customize a second one of the heterogeneous processing nodes according to the individualized design needs to provide the desired embedded system, wherein the second one of the heterogeneous processing nodes is configured to perform a different function than the first one of the heterogeneous processing nodes;
means for utilizing the infrastructure to customize any remaining heterogeneous processing nodes according to the individualized design needs to provide the desired embedded system, wherein each one of the remaining heterogeneous processing nodes is configured to perform a different function than any of the other heterogeneous processing nodes; and
a network root configured to communicate with a first network and a second network, wherein a first set of the heterogeneous processing nodes is configured as a first group that is configured to execute a plurality of functional nodes and that communicates using the first network, and a second set of the heterogeneous processing nodes is configured as a second group that is configured to execute a plurality of functional nodes different than the functional nodes executed by the first group and that communicates using the second network, the network root providing communication between each of the nodes of the first and second groups and a single common system interface, a bulk RAM, a common memory interface, and a network output interface.

18. The system of claim 17 wherein the infrastructure means further comprises a predetermined set of interfaces within and among the plurality of heterogeneous nodes.

19. The system of claim 18 wherein the interfaces within each one of the heterogeneous processing nodes further comprise interfaces between a memory unit, a node wrapper unit, and an execution unit.

20. The system of claim 19 wherein the means for utilizing the infrastructure further comprises a customized execution unit that replaces the execution unit and interfaces with the memory unit and node wrapper unit within at least one of the heterogeneous processing nodes.

* * * * *